United States Patent [19]
Donahue

[11] 4,086,716
[45] May 2, 1978

[54] FISHING POLE TRIPOD

[76] Inventor: Richard W. Donahue, 2707 Penna. Ave. West, Warren, Pa. 16365

[21] Appl. No.: 725,019

[22] Filed: Sep. 20, 1976

[51] Int. Cl.² .......................................... A01K 97/10
[52] U.S. Cl. ...................................... 43/21.2; 248/533
[58] Field of Search .................. 43/21.2; 248/532, 533

[56] References Cited
U.S. PATENT DOCUMENTS

| 2,204,692 | 6/1940 | Parisio | 43/21.2 X |
| 2,438,388 | 3/1948 | Dolk | 248/532 |
| 2,752,115 | 6/1956 | Green | 43/21.2 X |
| 3,636,649 | 1/1972 | Paiva | 43/21.2 |

Primary Examiner—Russell R. Kinsey
Assistant Examiner—Daniel J. Leach
Attorney, Agent, or Firm—Charles L. Lovercheck

[57] ABSTRACT

A fish pole tripod made up of an elongated main support rod pointed at its first end for ground insertion and a rod clevis supported on the second end of the main rod support. V-shaped pointed legs are swingably supported on the second end of said rod support and a tubular rod handle holder is fixed to the rod support adjacent the pointed end thereof.

1 Claim, 2 Drawing Figures

FISHING POLE TRIPOD

REFERENCE TO PRIOR ART

The general type of fish pole support disclosed herein is shown in U.S. Pat. Nos. 3,636,649, 3,881,269, and 3,546,804. The fishing pole supports disclosed in these patents are all complicated in construction, expensive to manufacture and had various other disadvantages.

OBJECTS OF THE INVENTION

It is the object of this invention to provide an improved fishing pole tripod.

Another object of the invention is to provide a fishing pole holder which may be readily and efficiently folded into a compact package for shipment or storage and which can be quickly and efficiently unfolded and set up for use.

Another object of the invention is to provide a fishing pole holder which is simple in construction, economical to manufacture, and simple and efficient to use.

With the above and other objects in view, the present invention consists of the combination and arrangement of parts hereinafter more fully described, illustrated in the accompanying drawings and more particularly pointed out in the appended claim, it being understood that changes may be made in the form, size, proportions, and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
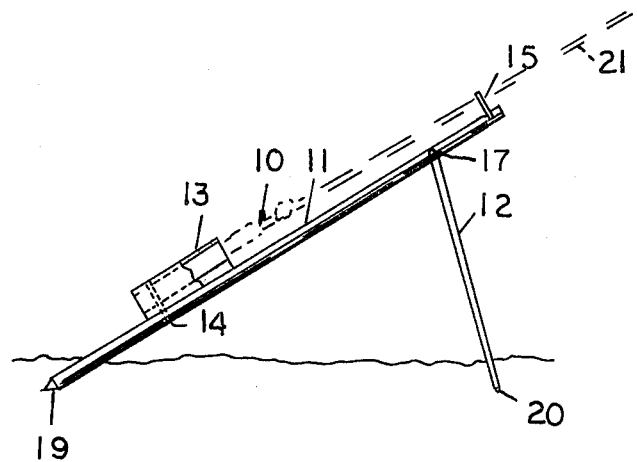
FIG. 1 is a side view of the fishing pole tripod according to the invention.
Figure 2:
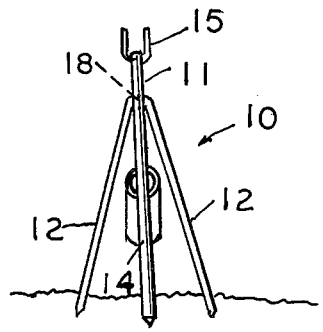
FIG. 2 is a front view of the fishing pole tripod according to the invention.

Now with more particular reference to the drawings, the fishing pole tripod indicated generally at 10 has an elongated main support rod 11, with V-shaped legs 12, extending through a hole 17, in the main support rod and swingable from a position generally in a common plane with the main support rod to the position shown in FIG. 1.

A tubular rod handle holder 13 rests on the main rod support 11, and is fixed thereto by means of a pin 14. The clevis 15, generally U-shaped extends through a second hole 18 in the end of the main rod support adjacent the V-shaped legs 12. The ends of legs 12 may be pointed at 20 for insertion into the ground.

When a fisherman sets up the tripod he may remove it from its case or other storage area and unfold the V-shaped legs 12 to approximately the position shown in FIG. 1. He will then force the point 19 into the ground at approximately a 30° angle to the plane of the ground with the rod extending upwardly therefrom. He will then force the points 20 of the legs into the ground at approximately a 60° angle to the ground as shown in FIG. 1. He may then rest the handle of his fishing pole in the tubular handle holder 13, with the rod itself indicated generally at 21 extending upwardly and resting between the upwardly extending legs of the clevis 15.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

1. In combination,
   a fishing pole and a fishing pole tripod comprising,
   a support rod having a pointed first end for ground insertion and a second end,
   a U-shaped member having an intermediate member and legs extending from said intermediate member and terminating in points for ground insertion,
   a first hole in said support rod adjacent said second end,
   said intermediate member of said U-shaped member extending through said first hole and swingably supporting said leg members on said support rod whereby said leg members may swing to a position generally perpendicular to said support rod and to a position parallel to said support rod with said rod support rod between said legs of said U-shaped member and co-planar therewith,
   a tubular rod handle holder fixed to said support rod adjacent the first end thereof,
   a U-shaped front clevis extending through a second hole at said second end in said support rod and having upwardly extending legs extending generally perpendicular to said support rod at a position spaced from said leg members,
   a fishing rod having a handle received in said rod handle holder,
   said fishing rod resting in said front clevis.

* * * * *